United States Patent [19]

Sambo

[11] 4,324,187
[45] Apr. 13, 1982

[54] RAIL VEHICLE HAVING A ROLL SUPPORT DEVICE

[75] Inventor: Claudio Sambo, Winterthur, Switzerland

[73] Assignee: Schweizerische Lokomotiv-und Maschinenfabrik, Winterthur, Switzerland

[21] Appl. No.: 70,742

[22] Filed: Aug. 29, 1979

[30] Foreign Application Priority Data

Sep. 4, 1978 [CH] Switzerland ............... 9282/78

[51] Int. Cl.³ ............................................. B61F 5/24
[52] U.S. Cl. ................................. 105/199 A; 105/164; 105/453; 280/772
[58] Field of Search ........... 105/199 R, 199 A, 199 F, 105/164, 453; 280/112 A, 772, 689

[56] References Cited

U.S. PATENT DOCUMENTS

| | | | |
|---|---|---|---|
| 2,353,503 | 7/1944 | Rost et al. ........................ | 280/112 A |
| 3,717,104 | 2/1973 | Law et al. .................. | 105/199 A X |
| 3,818,841 | 6/1974 | Julien ................................. | 105/164 |
| 3,906,869 | 9/1975 | Dobson et al. ............. | 105/199 A X |
| 3,977,694 | 8/1976 | Nordstrom ................. | 105/199 A X |
| 4,153,272 | 5/1979 | Fiedler et al. ...................... | 280/689 |

FOREIGN PATENT DOCUMENTS

| | | | |
|---|---|---|---|
| 2135633 | 2/1973 | Fed. Rep. of Germany ... | 105/199 A |
| 2422825 | 1/1975 | Fed. Rep. of Germany ...... | 105/164 |
| 540805 | 10/1973 | Switzerland .................... | 105/199 A |

*Primary Examiner*—Randolph A. Reese
*Attorney, Agent, or Firm*—Kenyon & Kenyon

[57] ABSTRACT

The rail car is provided with a roll support device which is independent of the resilient weight support springs. The roll support device provides resistance to the rolling motions of the car body relative to the truck frame and includes connecting elements which couple the body and truck together. The elements are inclined to the vertical center plane of the car body and include an angle of more than 10°. Under the action of a centrifugal force on the body, the connecting elements are subjected to a relative tilting motion which causes a roll inclination of the car body in opposition to the centrifugal force.

13 Claims, 13 Drawing Figures

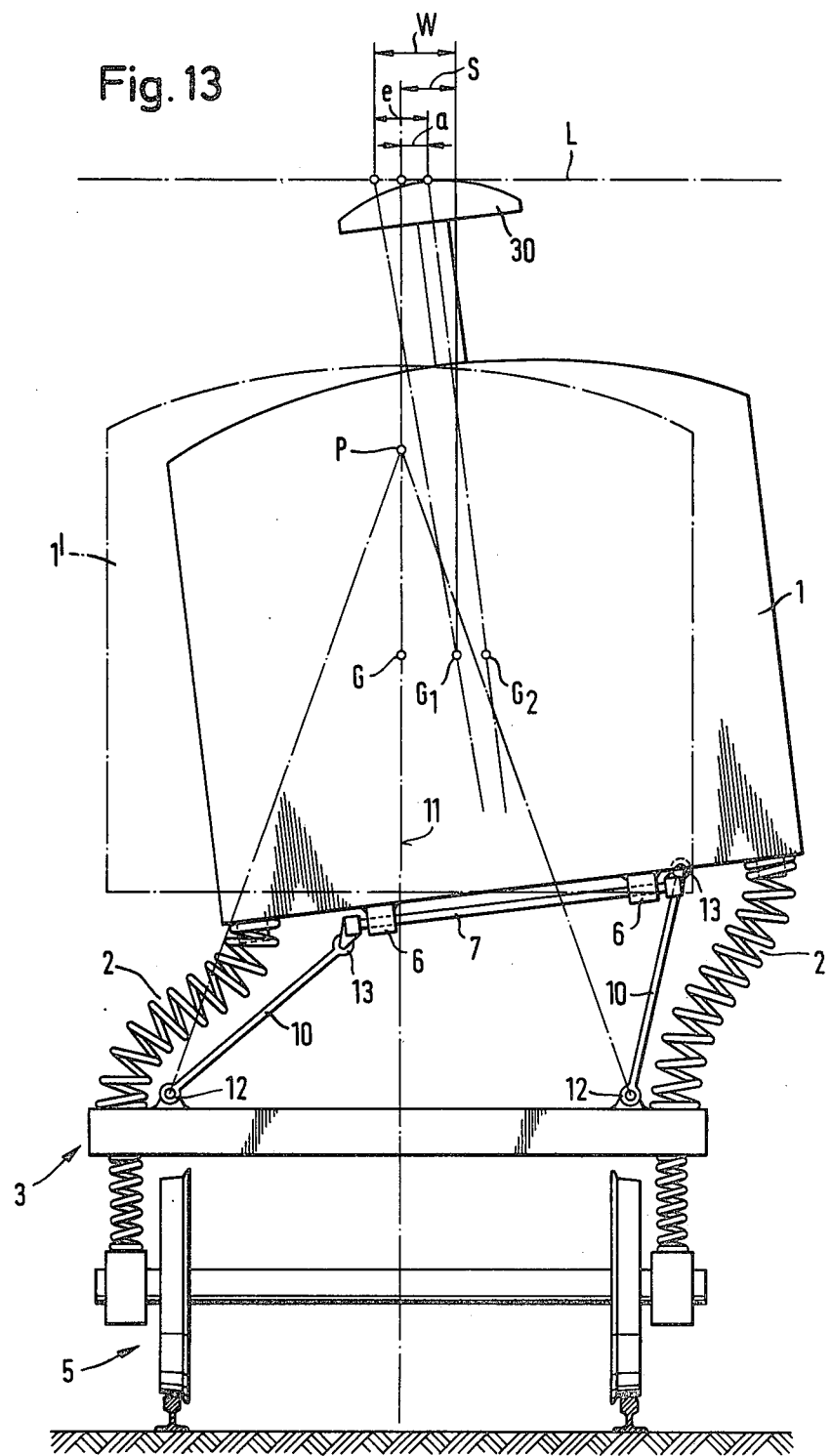

RAIL VEHICLE HAVING A ROLL SUPPORT DEVICE

This invention relates to a rail vehicle and more particularly to rail cars having a vehicle body supported on trucks.

As is known rail vehicles, such as, cars, are generally constituted by a body mounted on trucks which have wheel sets for travel along a pair of rails. Usually, the trucks (undercarriages) of a rail car each have a resilient primary support device for supporting a truck frame on the wheel sets of the truck and a resilient secondary support device for supporting the vehicle body on the truck frame, e.g. via springs. These devices damp the dipping motion of the vehicle body relative to the truck and are responsible for the travelling behavior of the vehicle and thus, for instance, for the travel comfort.

In such a rail car, the body has the tendency, when negotiating curves, to shift transversely outward due to the centrifugal forces, if the connection between the body and the truck is resilient in the transverse direction. Since the centrifugal force acts at the center of gravity of the body, which is generally situated higher than the point of attack of the restoring force of the springs, the body is also inclined outward with a rolling motion. This angular rotation about the center of gravity of the body has, among other things, an adverse effect, in the case of an electrically propelled vehicle, for instance, on the position of an overhead trolley arm of the vehicle relative to a trolley wire. Theoretically, the center of the trolley arm should also be perpendicularly, i.e. directly, above the center of the track.

In some cases, attempts have been made to counteract the above effects by banking the track in the curves. However, the extent of this is limited. The curves are thus frequently traversed by high-speed vehicles at speeds which still cause a considerable free lateral acceleration in spite of curve banking. Roll and lateral shifting are then caused not by the entire centrifugal force but by the non-compensated residual component.

As described in Swiss Pat. No. 540,805, it has also been known to provide a rail car with a mechanical roll support device which is substantially independent of the primary support device in order to provide resistance to the roll twist of the vehicle body relative to the truck frame in the transverse vertical plane. Such a roll support device has a torsion rod which is arranged horizontally and transversely to the truck, and lever arms which are fastened to the ends of the torsion rod to extend horizontally and parallel to the longitudinal direction of the vehicle and away from the torsion rod in the same direction. The torsion rod is mounted in pillow blocks which are firmly arranged on the truck. In addition, a link support is joined to the free end of each lever arm with the other end of the link support linked to the body. The link supports are arranged parallel to each other and to the longitudinal center plane of the car body and perpendicular to the torsion rod. A rolling motion of the body causes a twist of the torsion rod, the roll forces acting via link supports and the lever arms on the torsion rod. The torsion rod resists being torsioned and keeps the roll within permissible limits.

In general, the installation of a roll support device has the effect that the roll angle toward the outside of the curve is greatly reduced. A small residual angle always remains due to the elastic resilience of the roll support device. In the following considerations, the shift of the trolley arm relative to the center of the track due to the lateral shift of the body relative to the truck will be designated with s; the shift due to the roll angle of the body, forced by the roll support device, assumed to be absolutely rigid, with w; and that due to the elasticity of the roll support device with e. The components s and e are counted as positive if they are directed toward the outside of the curve, while the component w is counted as positive if pointed toward the inside of the arc.

In the heretofore known roll support device according to Swiss Pat. No. 540,805, the parallel link supports, the torsion rod and the body are parts of an articulated rectangle with the effect that the component $w=0$, and the entire trolley arm displacement becomes $a=s+e$. The component e counts more heavily inasmuch as this component is noted very strongly especially if the trolley arm is arranged at a great height. If a centrifugal force acts on the body, the components s and e therefore act in the same direction, i.e., additively; only the value e can be influenced, for all practical purposes. To keep the total shift a small, the value e must therefore be kept as small as possible. This means that the roll support device must be constructed as rigidly as possible and the torsion rod must have a relatively large diameter. The applicability of the known arrangement is limited to vehicles with relatively low speeds even if the roll support device is of rigid construction, since the centrifugal forces increase as the square of the velocity.

From the book "Elektrische Triebfahrzeuge" (Electrically Propelled Vehicles) by Dr. Karl Sachs, Page 611, 1973, a hydraulic roll support device is also known which has two double-acting piston-cylinder units; the cylinder spaces of which are connected to each other cross-wise. The units are linked, on both sides of the longitudinal plane of the body, with one end to the body and with the other end to the truck frame. The axes or action lines of the units are arranged parallel to each other and to the longitudinal center plane of the body, and perpendicular to the wheel-set axles. Kinematically, this likewise involves an articulated rectangle consisting of the body, the truck frame and the parallel piston-cylinder sets, where the displacement components s and e act in the same direction, i.e., additively, if a centrifugal force acts on the body. Elasticity in the construction also has an adverse effect here, and the usefulness of the arrangement is likewise limited to low velocities.

Accordingly, it is an object of the invention to provide a rail vehicle with a roll support means which is able to enhance the roll behavior of the vehicle.

It is another object of the invention to provide a rail vehicle with a roll support means which permits an increase in the permissable travel velocity of the vehicle.

It is another object of the invention to improve the roll behavior and permissible travel velocity of a rail car in a simple manner.

Briefly, the invention provides a rail vehicle which is comprised of a vehicle body, at least one truck for supporting the body on rails and which has a truck frame and at least one set of wheels for rolling on the rails and a resilient support means supporting the body on the truck frame. In addition, the vehicle has a roll support means which includes two connecting elements coupling the vehicle body and the truck frame together without transmitting the weight of the body to the frame so that the body is essentially freely movable in a transverse direction relative to the truck frame. These elements are disposed on opposite sides of a vertical center plane which extends longitudinally of the vehicle body. Also, the elements have axes, or lines of action, which are disposed in angular relation to the vertical center plane in order to define an included angle of at least 10°. These axes intersect at a point located above the center of gravity of the vehicle body whereby, under the action of a centrifugal force on said vehicle body (acting on the center of gravity), the connecting elements are subjected to a relative tilting motion which causes an inclination of the vehicle body about the center of gravity in opposition to the centrifugal force.

It is to be noted that the connecting elements are such that although the weight of the vehicle body is not transmitted to the truck frame, roll forces are transmitted from the body to the truck frame.

Because of the inclined position of the connecting elements, the articulated rectangle which is formed by the connecting elements, the body and the truck, is changed into a trapezoidal articulated rectangle. This produces the effect that the body, in the event of a lateral shift relative to the truck because of centrifugal forces, is inclined simultaneously toward the direction opposed to the centrifugal force, i.e., toward the inside of the arc. A forced rolling motion opposing the centrifugal force is thus generated, and thereby a positive value of the displacement component w of a trolley arm on the vehicle body occurs due to the roll angle. The shift e caused by the elasticity of the roll support means is effectively unchanged toward the outside of the arc, so that the total shift becomes $a = s + e - W$. It is possible thereby to keep the value a low by matching the values e and w to each other, and to thereby increase the permissible travel velocity in curves.

By a suitable choice of the angle enclosed by the connecting elements, the value w can be influenced in almost any desired manner. If a large value is chosen, a large value of e is permissible so as to arrive overall at a small displacement a. It follows that the roll support means can have an almost arbitrarily large amount of elasticity. This can always be compensated by a suitable choice of the angle between the connecting elements. It is important that the roll support means is entirely independent of the support means which supports the weight of the car body on the truck frame and that the connecting elements are completely relieved of the weight of the body.

Depending on the application, the roll support means can be built more or less elastic, so that the trolley arm is held in the correct position at higher speeds. With an elastic construction, the roll support means of several trucks under the same body influence each other very little. Twisting, i.e., different roll angles of the individual trucks relative to the body, is permissible without the occurrence of greatly different forces.

The roll support means can be constructed in a mechanical as well as hydraulic manner and can be realized in several variants. There are, for instance, four possible variants in the arrangement of a mechanical roll support means which has, according to one embodiment of the invention, a torsion rod rotatably mounted in pillow blocks mounted on one of the body and truck frame with a swinging arm rigidly arranged at each of the two ends of the rod. In this case, the connecting elements are in the form of bars or rods with one end pivotally secured to a respective arm and an opposite end pivotally secured to the other of the body and truck frame. In this embodiment, the torsion rod is constructed not for rigidity but merely for strength. Thus, the torsion rod can be made relatively thin and resilient. As such, the torsion rod can be less expensive and better able to accommodate than a rigid support element of previously known types of roll support devices which are usually constructed as a tube with a relatively large diameter.

In a first variant of the above embodiment, the pillow blocks are secured in a rigid manner to the truck frame and each bar which constitutes a connecting element is secured at one end to the vehicle body and at the other end to a swinging arm on the torsion rod. In addition, the end of the bar which is secured to the vehicle body is disposed at a greater distance from the vertical center plane of the vehicle body than the end of the bar which is secured to the swinging arm.

In a second variant, wherein the pillow blocks are secured to the truck frame and one end of each bar is secured to the vehicle body, the end of the bar which is secured to the vehicle body is disposed at a smaller distance from the vertical center plane of the vehicle body than the end of the bar which is secured to the swinging arm on the torsion rod.

In a third variant, the pillow blocks are secured to the vehicle body and each bar is secured at one end to the truck frame. In this variant, the end of the bar which is secured to the truck frame is disposed at a smaller distance from the vertical center plane of the body than the end of the bar secured to the swinging arm on the torsion rod.

In a fourth variant, wherein the pillow blocks are secured to the vehicle body and each bar is secured at the respective ends of the truck frame and the swinging arm, the end of the bar secured to the truck frame is at a greater distance from the vertical center plane of the body than the other end of the bar.

These embodiment variants make it possible to adapt the roll support means to a large extent to different situations; the first and the fourth variants make possible shorter torsion rods and are suitable for relatively rigid constructions, while the second and the third variants permit longer torsion rods and result in relatively elastic constructions.

In a further embodiment of the invention, a precise coupling, largely free of wear, of the car body to the truck can be ensured if the roll support means uses connecting elements in the form of a double-acting hydraulic piston-cylinder unit with the cylinder spaces of the units connected to each other cross-wise. In this case, a means is provided in at least one unit for compensating the thermal expansion of the hydraulic fluid.

In one variant of this latter embodiment, one end of each piston-cylinder unit is secured to the body and the opposite end is secured to the truck frame at a greater distance from the vertical center plane that the end secured to the body.

In a second variant of the above embodiment, one end of each piston-cylinder unit is secured to the vehicle body while the opposite end is secured to the truck frame at a smaller distance from the vertical center plane of the body than the ends secured to the body.

The considerations discussed in connection with the mechanical embodiments of the invention also apply to the hydraulic embodiments. The elasticity of the roll support means, which can be considerable, is then given a priori. The effect of this elasticity can be compensated by the degree of inclination of the piston-cylinder units. However, the elasticity of the arrangement can, in this case, be too small to equalize the mutual influence of the roll supports of several trucks. In order to make twisting to any degree permissible, the piston-cylinder units of at least two trucks, according to another embodiment of the invention, can also be coupled to each other via two conduits or lines. In this case, each line connects a respective one of the cylinder chambers of one unit associated with one truck with a similarly disposed chamber of one unit of the other truck, i.e. a chamber which can be acted upon in the same sense. This forms, so to speak, the mean value of the rolling motion between the body and all trucks connected in the above-mentioned manner.

In all embodiments of the invention described above, a practically useful effect of the inclination of the connecting elements is obtained from an included angle of about 10° and increases, in general, the lower the intersection of the action lines is located. However, the effect decreases again if the point of intersection is located in the vicinity of the center of gravity of the body. For every vehicle geometry, there is an optimum height of this point of intersection.

In accordance with the invention, additional rolling motions, which might be generated for instance, in the primary support means serving to support the truck frame on the wheel sets, can be corrected at the same time if they are taken into consideration in the calculations.

These and other objects and advantages of the invention will become more apparent from the following detailed description and appended claims taken in conjunction with the accompanying drawings in which:

FIG. 13 illustrates a sectional view similar to FIG. 7 of a rail car in which the vehicle body is inclined in a direction which is opposed to the acting centrifugal force.

In the figures, like parts are provided with the same reference symbols.

Figure 1:
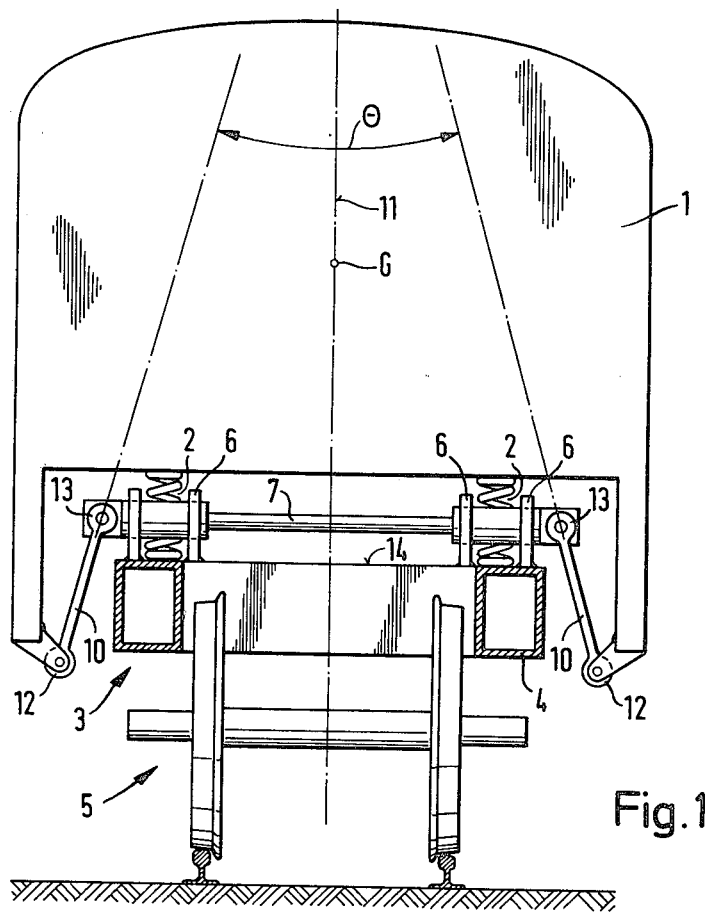
FIG. 1 illustrates a view taken on line I—I of FIG. 2 of a rail car constructed with a first variant of a mechanical roll support means according to the invention.
Figure 2:
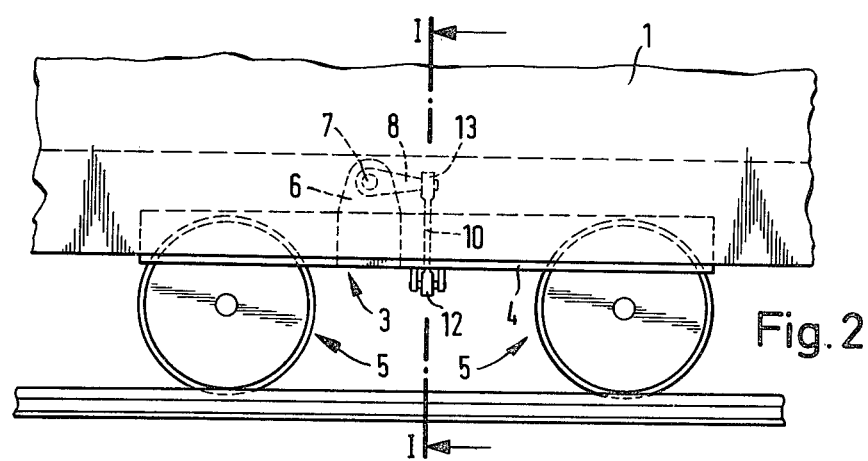
FIG. 2 illustrates a partial side view of the rail car according to FIG. 1 in a smaller scale.

Referring to FIG. 1 and 2, the rail vehicle is constructed with a vehicle or car body 1 having a center of gravity G located on a vertical central plane 11 of the body 1 as well as one or more trucks 3 for supporting the body 1 on a pair of rails. As shown, each truck 3 includes a truck frame 4 and two sets of wheels 5 for rolling on the rails. The car body 1 is supported via a resilient secondary support means 2 on each truck 3 so as to be essentially freely movable in a transverse direction relative to the truck frame 4. The secondary support means includes two springs, as shown, each of which is connected between and to the truck frame 4 and the body 1 for tilting resiliently in a transverse direction relative to the truck frame (see FIG. 13). The truck frame 4 is supported on the two wheel sets 5 via a primary spring support system (not shown). In addition, a mechanical roll support means is interposed between the car body 1 and the truck frame 4. This roll support means is separate from and independent of the secondary support means 2.

As shown, the roll support means includes two connecting elements 10 which couple vehicle body 1 and the truck frame 4 together without transmitting the weight of the body 1 to the frame 4 but with the transmission of roll forces therebetween. In addition, the roll support means further includes a pair of pillow blocks 6 which are mounted in rigid manner on the truck frame 4, a torsion rod 7 which is rotatably mounted in the pillow blocks 6 and a pair of arms 8. Each arm 8 is secured on a respective end of the torsion rod 7 to pivot about the torsion rod and each extends approximately in the longitudinal direction of the body 1. As shown, the pillow blocks 6 are mounted on an upper surface 14 of the truck frame 4.

Each bar 10 is pivotally secured at the lower end, 12, as viewed, to a lower girder of the body 1 while the upper end 13 is pivotally secured to a respective arm 8. As shown in FIG. 1, the end 12 of each bar 10 is at a greater distance from the vertical center plane 11 than the end 13 secured to the arms 8. Further, the bars 10 are disposed on opposite sides of the vertical plane 11 on axes, or action lines, which are disposed in angular relation to the plane 11 to define an included angle $\theta$ of at least 10°. These axes intersect at a point (not shown) located above the center of gravity G of the body 1.

During operation, a rolling motion of the body 1 acts as a torque in the torsion rod 7 via the bars or rods 10 and the swinging arms 8. This torque twists the torsion rod 7 by a twist angle which is a function of the torque and the torsional stiffness of the torsion rod 7. The inclined rods 10 form, together with the body 1, the torsion rod 7 and the swinging arms 8, a trapezoidal articulated rectangle. This has the effect that the body 1 is tilted, if shifted sideways relative to the truck 3 due to centrifugal forces, in a direction opposed to the latter, i.e., toward the inside of the arc. This, however, also generates a positive value of the previously mentioned displacement component w of a trolley arm (not shown) located on the roof of the body 1. This allows the intended possibility of keeping the total displacement $a = s + e - w$ small by matching the values e and w to each other and of increasing the permissible travel velocity of the vehicle in curves.

Figure 3:
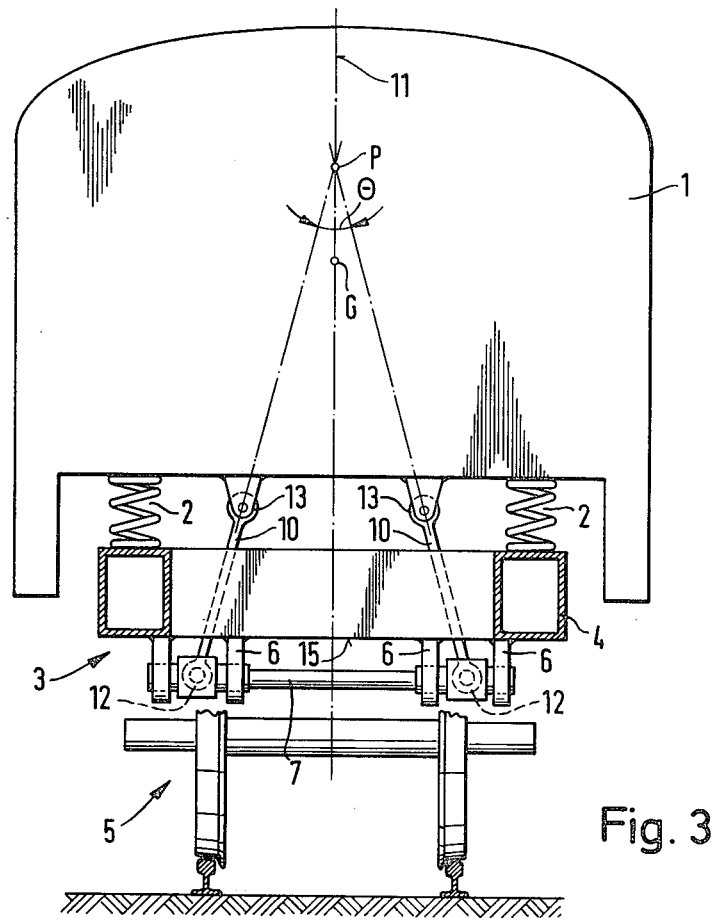
FIG. 3 illustrates a view taken on line III—III of FIG. 4 of a rail car with a second variant of a mechanical roll support means according to the invention.
Figure 4:
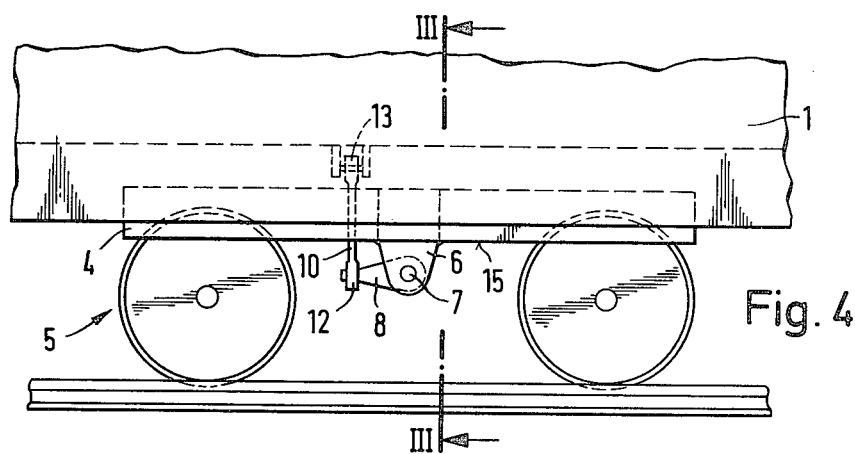
FIG. 4 illustrates a partial side view of the rail car according to FIG. 3 in a smaller scale.

Referring to FIGS. 3 and 4, a second variant of the mechanical roll support means has the pillow blocks 6, in which the torsion rod 7 is mounted, fastened to a lower surface 15 of the truck frame 4, and the lower ends 12 of the rods 10 are linked to the swinging arms 8 while their upper ends 13 are linked to the body 1. Also, in this embodiment, the action lines of the rods 10 intersect above the center of gravity G of the body 1, the intersection point P being located within the outline of the body 1. Kinematically, here also a trapezoidal articulated rectangle is effective which causes a positive value of the displacement component w, which is directed toward the inside of the arc.

Figure 5:
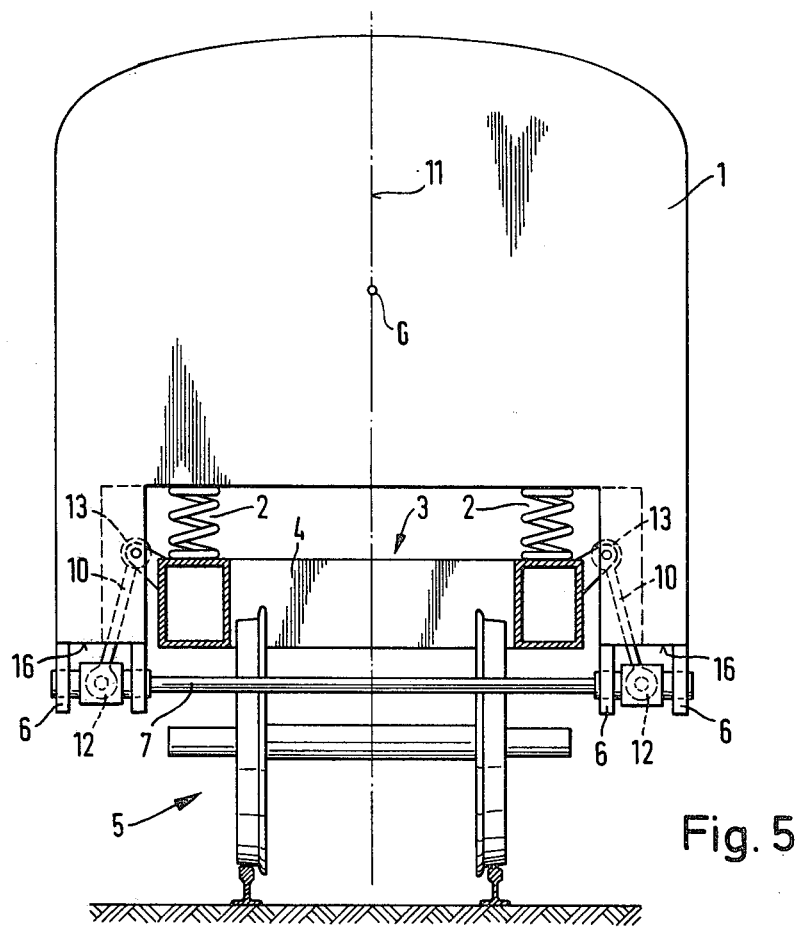
FIG. 5 illustrates a view taken on line V—V of FIG. 6 of a rail car with a third variant of a mechanical roll support means according to the invention.
Figure 6:
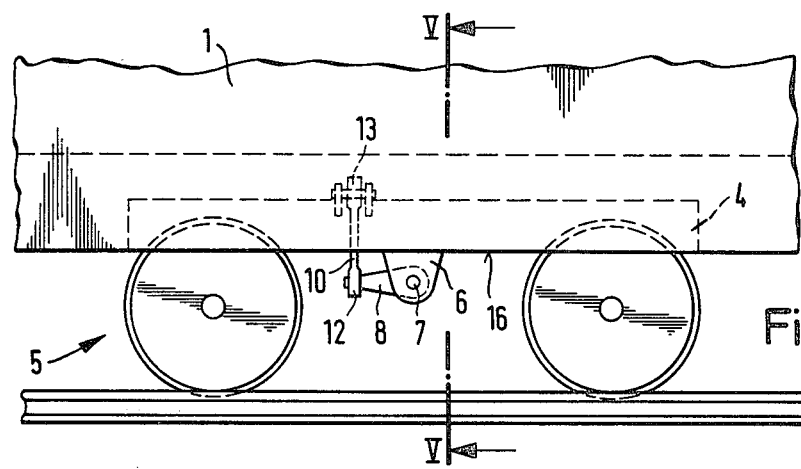
FIG. 6 illustrates a partial side view of the rail car according to FIG. 5 in a smaller scale.

Referring to FIGS. 5 and 6, as a third variant, the pillow blocks 6 are rigidly arranged on a lower surface 16 of the lower girder of the body. In this case, the lower ends 12 of the rods 10 are linked to the swinging arms 8 and their upper ends 13 to the truck frame 4.

Figure 7:
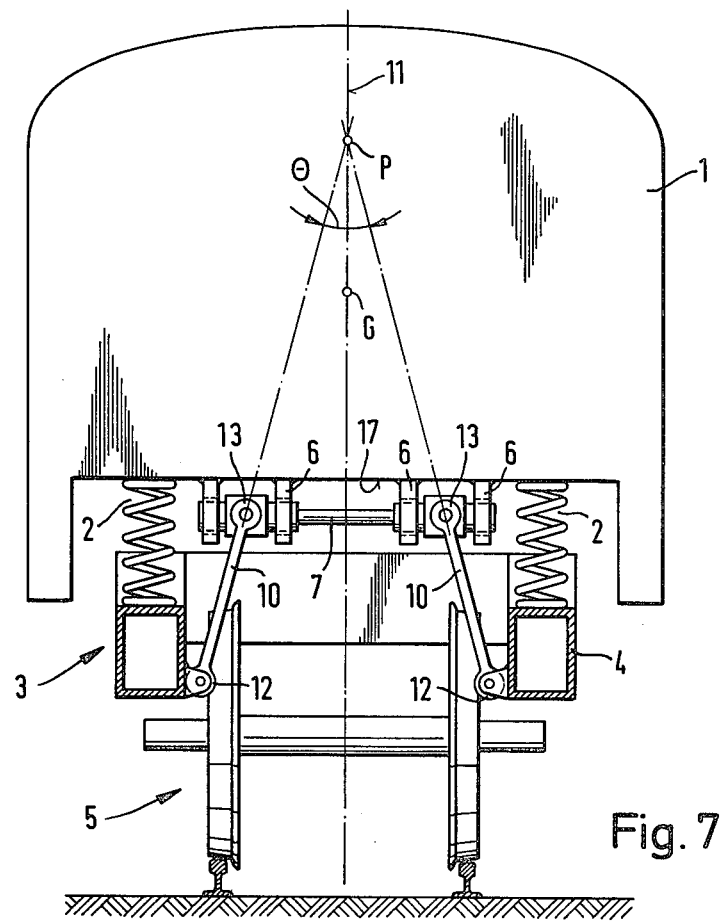
FIG. 7 illustrates a view taken on line VII—VII of FIG. 8 of a rail car with a fourth variant of a mechanical roll support means according to the invention.
Figure 8:
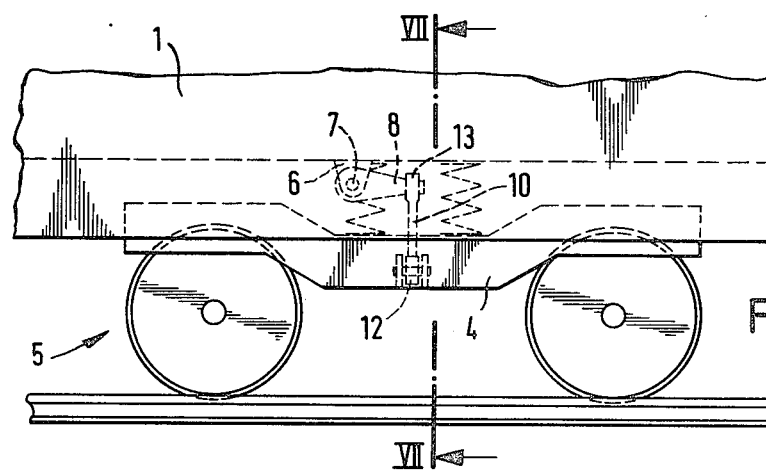
FIG. 8 illustrates a partial side view of the rail car according to FIG. 7 in a smaller scale.

Referring to FIGS. 7 and 8, as a fourth variant, the pillow blocks are rigidly arranged at a lower surface 17 of the body 1 while the lower ends 12 of the rods 10 are linked to the truck frame 4 and their upper ends 13 to the swinging arms 8.

Figure 9:
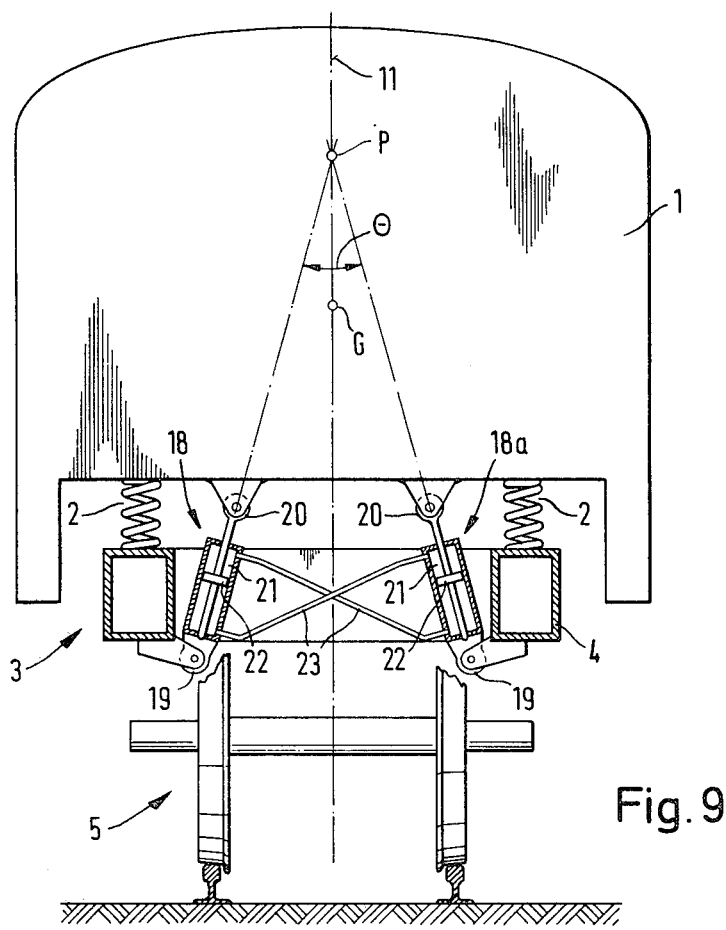
FIG. 9 illustrates a view taken on line IX-IX of FIG. 10 of a rail car with a first variant of a hydraulic roll support means according to the invention.
Figure 10:
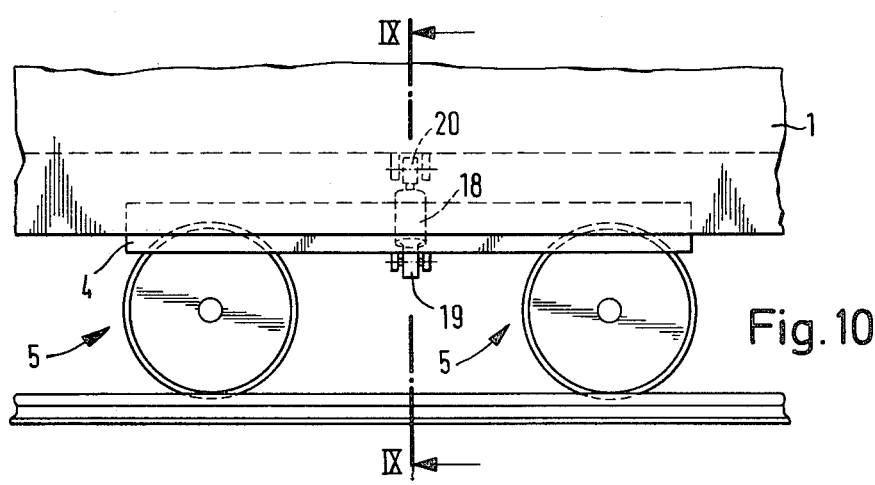
FIG. 10 illustrates a partial side view of the rail car of FIG. 9.

Referring to FIGS. 9 and 10, the roll support means may be constructed in a hydraulic manner. To this end, each connecting element of the roll support means is in the form of a double-acting hydraulic piston-cylinder unit 18, 18a. As shown, each unit 18, 18a is formed of a cylinder 21 with a piston 22 for dividing the cylinder 21 into two chambers. In addition, a pair of conduit lines 23 interconnect the cylinder chambers to each other in a cross-wise manner. That is, each line 23 connects an upper chamber of one unit to a lower chamber of the other unit. Any suitable hydraulic fluid may be utilized in the chambers and conduits 23. In addition, the closed hydraulic loop which is formed by the units 18, 18a and conduits 23 can be provided with a means (not shown) for compensating thermal expansion in the hydraulic fluid. Such a means functions so as to prevent rupture of the units 18, 18a or conduits 23 at elevated operating temperatures.

As shown in FIG. 9, the piston-cylinder units 18, 18a are arranged on opposite sides of the vertical center plane 11 of the car body 1 and the lower ends 19 of each are linked to the truck frame in a pivotal manner. The upper ends 20 of each unit 18, 18a, which are at the ends of the piston rods, are pivotally secured to the car body 1. The action lines of the units 18, 18a are inclined with respect to the center plane 11 and intersect at a point of intersection P which is located above the center of gravity G of the body 1. The units 18, 18a are parts of a trapezoidal articulated rectangle, the effect of which is to produce a positive value, directed towards the inside of the arc, of the displacement component w if the body 1 is shifted laterally.

Figure 11:
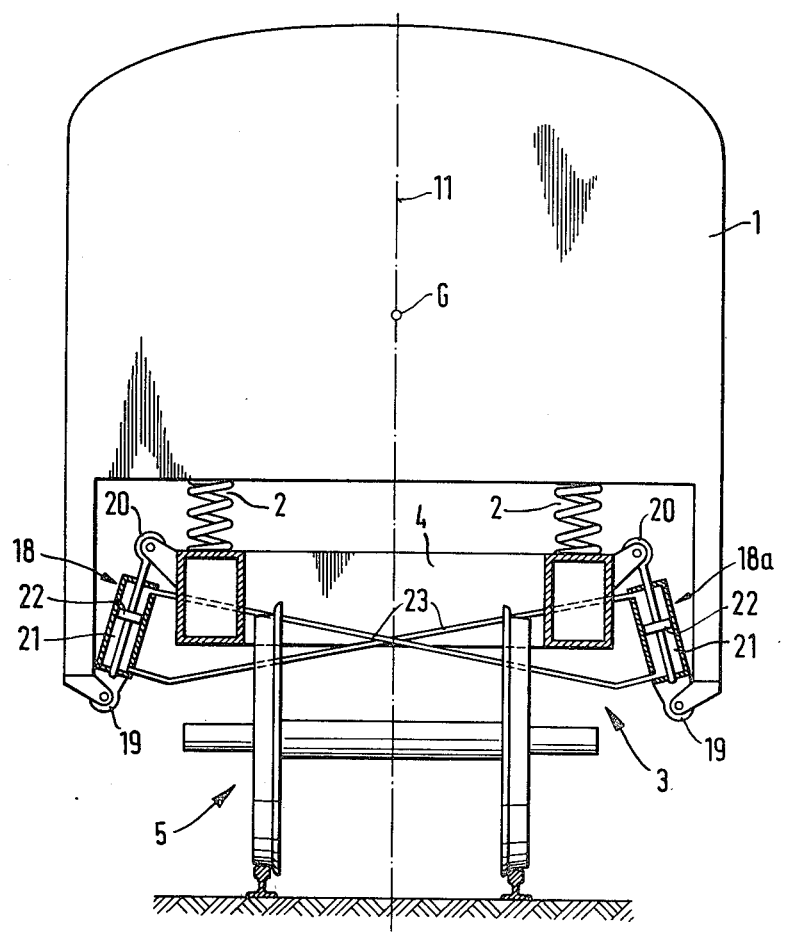
FIG. 11 illustrates a sectional view similar to FIG. 9 through a rail car with a second variant of a hydraulic roll support means according to the invention.

Referring to FIG. 11, as a further variant, the lower ends 19 of the piston-cylinder units 18, 18a are linked to the body 1 and the upper ends 20 are linked to the truck frame 4. As shown, the units 18, 18a are arranged at a larger distance from each other and can include a larger angle $\theta$.

Figure 12:
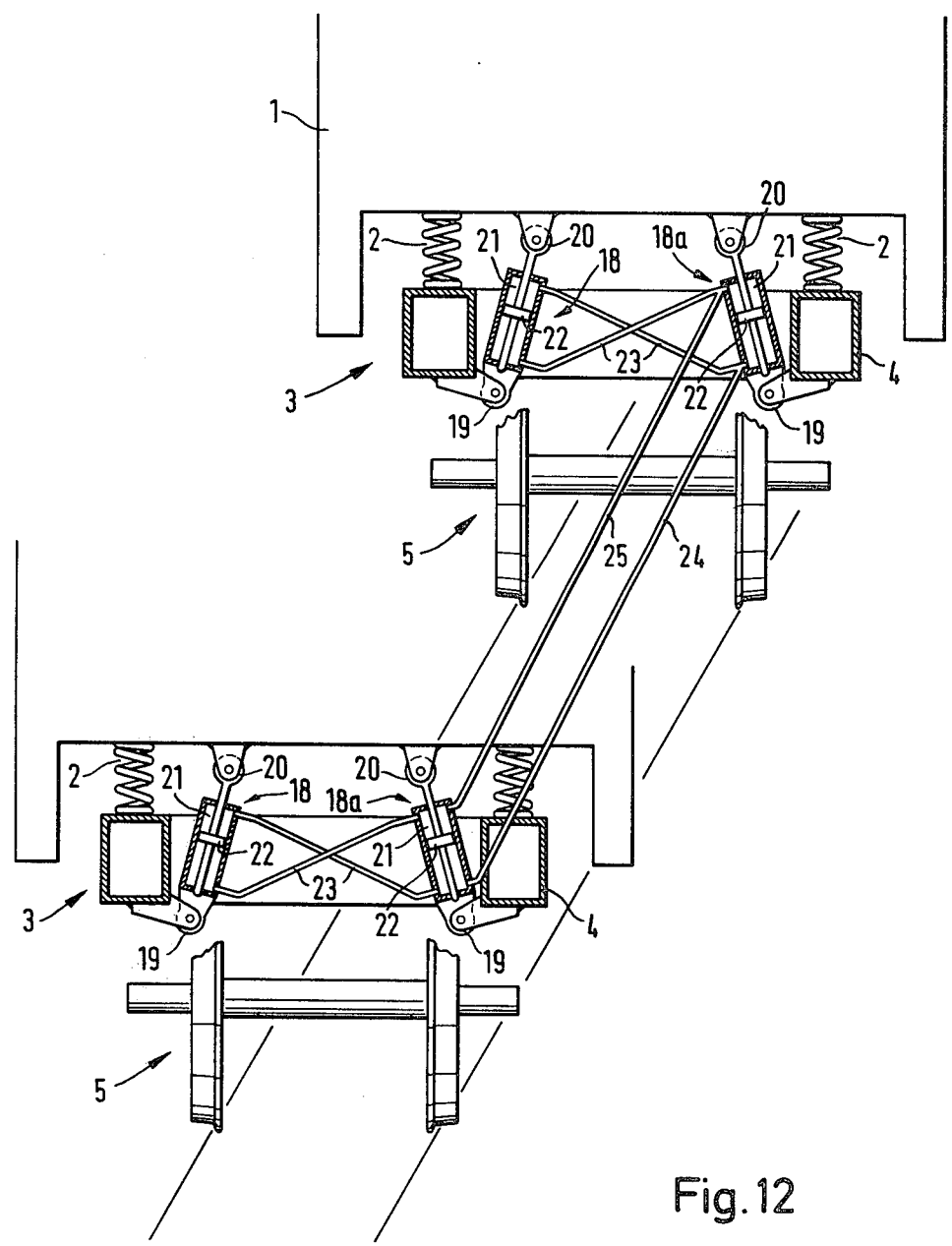
FIG. 12 illustrates a part perspective view of a rail car in which the hydraulic roll support means of two trucks are hydraulically connected to each other in accordance with the invention.

Referring to FIG. 12, pairs of units 18, 18a arranged and connected in accordance with FIGS. 9 and 10 of two trucks 3 can be connected to each other. In this embodiment, a pair of conduits or lines 24, 25 are disposed on one side of the vertical plane 11 with one line 24 connecting the lower cylinder chambers and the other line 25 connecting the upper cylinder chambers. This produces two closed hydraulic loops, of which each contains four cylinder chambers connected to each other, and specifically, the two lower cylinder chambers on one longitudinal side of the vehicle and the two upper cylinder chambers on the same longitudinal side of the vehicle. It is understood that, for instance, instead of having the line 25 connect the upper cylinder chambers of the units 18a, a corresponding connection can be provided between the lower cylinder chambers of the units 18.

Pairs of units arranged according to FIG. 11 as well as the pairs of units of several trucks can likewise be connected advantageously in the described manner. By such connections, mean values of the rolling motion between the body 1 and the respective trucks 4 are formed, and twisting of the trucks 4 relative to each other becomes permissible.

The effect of the trapezoidal articulated rectangle present in all embodiment examples is illustrated in FIG. 13. A centrifugal force, which is directed in FIG. 13 to the right and is acting on the vehicle body 1, is assumed, which brings the body 1 from the central or rest position (shown dash-dotted) into the position shown by solid lines. In this process, the body 1 is displaced, on the one hand, to the right and, on the other hand, tilts toward the left. The displacements of a trolley arm 30 mounted on the body 1 caused thereby are shown on line L. Here, the quantity s designates the displacement of the trolley arm 30 relative to the center of the track due to the lateral displacement of the body 1 relative to the truck 3. Thus, the center of gravity G of the body 1 is placed in the position $G_1$. The quantity w designates the displacement of the trolley arm 30 due to the roll angle of the body 1 caused by the roll support means, if assumed to be absolutely rigid. Due to the elasticity of the roll support means, the body 1 tilts to the right and the center of gravity G is shifted into the position $G_2$. The corresponding displacement of the trolley arm 30 on the line L is designated with e. The quantity a designates the total displacement of the trolley arm 30 relative to the center of the track and can be calculated from the relation $a = s - w + e$.

What is claimed is:

1. A rail vehicle comprising
a vehicle body having a center of gravity;
at least one truck for supporting said body on rails, said truck including a truck frame and at least one set of wheels for rolling on rails;
a resilient support means supporting said body on said truck frame with said body being essentially freely movable in a transverse direction relative to said truck frame; and
a roll support means including two connecting elements coupling said vehicle body and said truck frame together without transmitting the weight of said body to said frame, said elements being disposed on opposite sides of a vertical center plane extending longitudinally of said body and on axes disposed in angular relation to said plane to define an included angle of at least 10°, said axes intersecting at a point located above said center of gravity of said body whereby under the action of a centrifugal force on said vehicle body, said connecting elements are subjected to a relative tilting motion which causes an inclination of said body about said center of gravity opposed to said centrifugal force.

2. A rail vehicle as set forth in claim 1 wherein said roll support means further includes a pair of pillow blocks mounted on one of said body and truck frame, a torsion rod rotatably mounted in said pillow blocks, and a pair of arms, each said arm being secured on a respective end of said torsion rod to pivot about said torsion rod and wherein each connecting element is a bar having one end pivotally secured to a respective arm and an opposite end pivotally secured to the other of said body and truck frame.

3. A rail vehicle as set forth in claim 2 wherein said pillow blocks are secured to said truck frame and said opposite end of each bar is secured to said vehicle body.

4. A rail vehicle as set forth in claim 3 wherein said opposite end of each bar is disposed at a greater distance from said vertical center plane than said one end of each bar.

5. A rail vehicle as set forth in claim 3 wherein said opposite end of each bar is disposed at a smaller distance from said vertical center plane than said one end of each bar.

6. A rail vehicle as set forth in claim 2 wherein said pillow blocks are secured to said body and said opposite end of each bar is secured to said truck frame.

7. A rail vehicle as set forth in claim 6 wherein said opposite end of each bar is disposed at a smaller distance from said vertical center plane than said one end of each bar.

8. A rail vehicle as set forth in claim 6 wherein said opposite end of each bar is disposed at a greater distance from said vertical center plane than said one end of each bar.

9. A rail vehicle as set forth in claim 1 wherein each connecting element is a double-acting hydraulic piston-cylinder unit having a piston and a pair of chambers, each chamber being disposed on an opposite side of said piston to receive hydraulic fluid, and wherein said roll support means further includes a pair of conduit lines, each said line interconnecting one chamber of one piston-cylinder unit with an opposite chamber of the other piston-cylinder unit.

10. A rail vehicle as set forth in claim 9 wherein one end of each unit is secured to said body and the opposite end of each unit is secured to said truck frame at a greater distance from said vertical center plane than said one end.

11. A rail vehicle as set forth in claim 9 wherein one end of each unit is secured to said body and the opposite end of each unit is secured to said truck frame at a smaller distance from said vertical center plane than said one end.

12. A rail vehicle as set forth in claim 9 which includes two of said trucks and two of said roll support means, each said roll support means being disposed between a respective one of said trucks and said vehicle body and which further comprises a pair of conduits on one side of said vertical center plane, each said conduit connecting a respective chamber of one piston-cylinder unit of one roll support means with a similarly disposed chamber of a piston-cylinder unit of the other roll support means.

13. A rail vehicle as set forth in claim 1 wherein said resilient support means includes at least two springs, each spring being connected between and to said truck frame and said body for tilting resiliently in a transverse direction relative to said truck frame.

* * * * *